Feb. 19, 1952  R. SCHUMAIER  2,586,390
TRACTOR HITCH
Filed July 15, 1947  2 SHEETS—SHEET 1
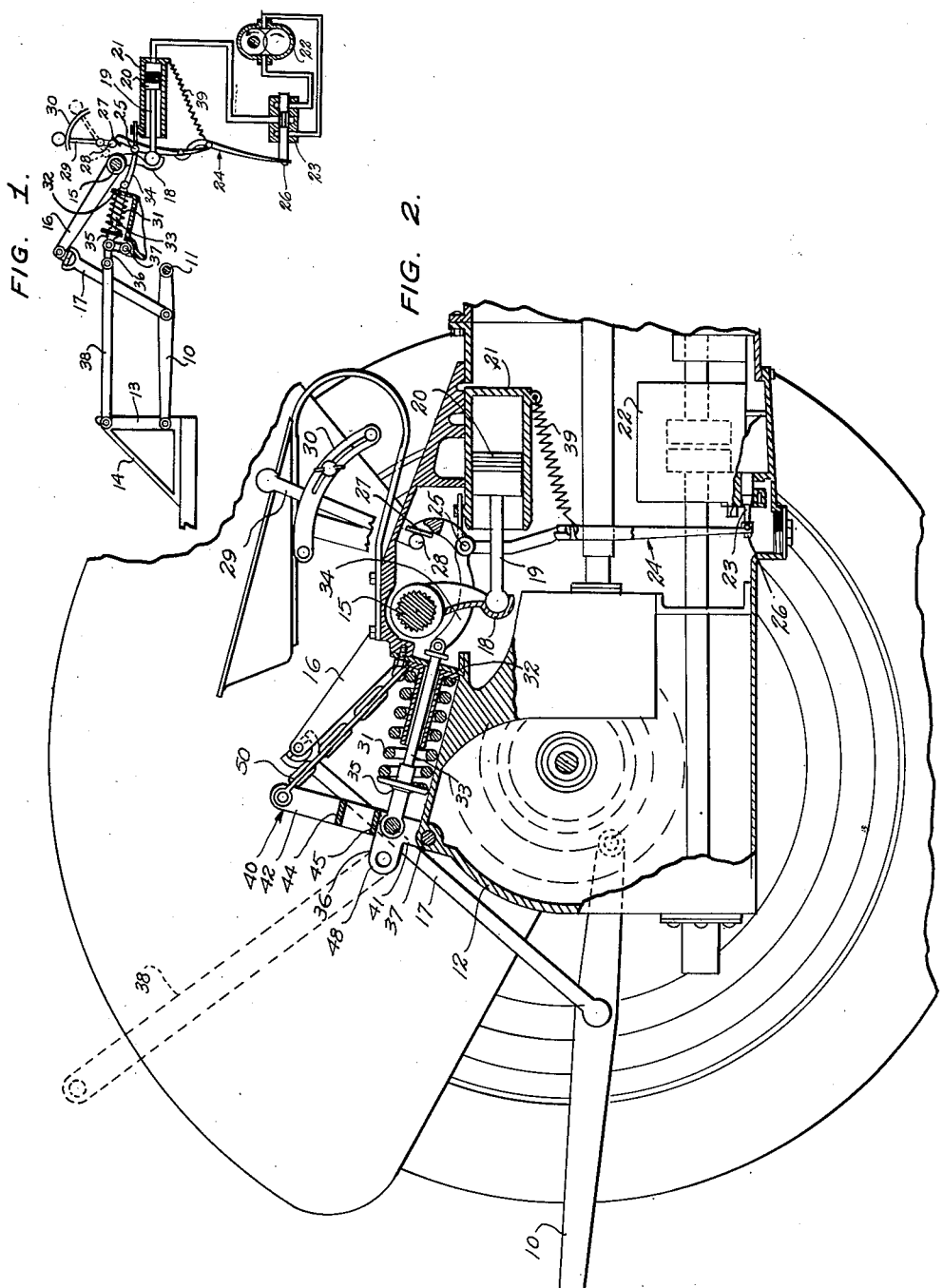
INVENTOR.
RUDOLPH SCHUMAIER,
BY
McMorrow, Berman & Davidson
ATTORNEYS.

Feb. 19, 1952    R. SCHUMAIER    2,586,390
TRACTOR HITCH

Filed July 15, 1947    2 SHEETS—SHEET 2

INVENTOR.
RUDOLPH SCHUMAIER,
BY
McMorrow, Berman + Davidson
ATTORNEYS.

Patented Feb. 19, 1952

2,586,390

UNITED STATES PATENT OFFICE 2,586,390

TRACTOR HITCH

Rudolph Schumaier, Saline, Mich.

Application July 15, 1947, Serial No. 761,020

7 Claims. (Cl. 97—50)

This invention relates to improvement in tractor hitches, and more particularly to an improved tractor hitch having hydraulic lift components operative to raise or lower the tractor tow or automatically maintain a tractor-towed implement at a substantially constant level. An example of a typical tractor hitch of the character referred to is the hitch used in the well-known "Ford-Ferguson System" and the present invention is primarily concerned with the modification of a "Ford-Ferguson" hitch to condition such a hitch to an operation not capable of performance by the hitch equipment as conventionally provided. The invention may be applied, however, to other hitch mechanisms without in any way exceeding the scope thereof.

The conventional "Ford-Ferguson" tractor hitch is designed particularly to automatically control the operating depth of ground-tilling implements such as plows, and cultivators, and although it has a manually operated control for adjusting the average operating depth of such implements, it is operative only when subjected to the forward rolling or tilting pressure of a ground-engaging implement towed by the tractor. The tractor is capable of numerous uses in addition to that of towing ground tilling implements, working a bulldozer blade, a grading scoop, or a snow plow, dragging logs and towing a two-wheel trailer being illustrative of such additional uses. When the tractor is used for any of the above-mentioned purposes it is necessary that the hydraulic lift components be subject to manual control. With manual control of the hydraulic lift, a bulldozer blade, grading scoop, or snow plow may be raised and lowered at will and positively held at any desired elevation within the operative limits of the mechanism, even though such implements are mounted upon the front portion of the tractor instead of being attached to the tractor draw bar, the tractor-connected end of a log may be raised and held in elevated position for dragging after the end of the log has been connected to the tractor draw bar, or the front end of a two-wheel trailer may be lifted for movement of the trailer by the tractor and lowered to the ground when the trailer has been moved to a desired position.

Manual control of the hydraulic hitch cannot be obtained as long as the elements providing automatic operation are in operative assembly in the hitch mechanism. With the automatic control elements disassociated attempted manual operation of the depth control mechanism may cause the hydraulic mechanism to rise or drop through its entire range of movement, but there is then no effective automatic or manual control for the hydraulic mechanism.

It is among the objects of the present invention to condition an automatically operating hydraulic tractor hitch such as a "Ford-Ferguson" tractor hitch for operation under manual control to increase the usefulness of such equipment and render it capable of operating such implements as bulldozer blades, grading scoops, and snow plows, as well as plows, harrows, and cultivators conventionally operated by such tractors.

A somewhat more specific object resides in the provision of an attachment or accessory for a "Ford-Ferguson" type of tractor which will render the tractor hitch subject to accurate manual control by the manually-operated depth-regulating control lever conventionally provided with such tractors, which accessory is simple in construction, economical to manufacture, may be quickly and easily assembled with the tractor mechanism without modifying any of the parts of such mechanism, and which may be assembled with the mechanism for either manual or automatic operation of the hydraulic components of the tractor hitch, depending upon the type of implement connected to the tractor.

Other objects and advantages will become apparent from a consideration of the following description in conjunction with the accompanying drawings, wherein:

Figure 1 is a diagrammatic illustration of a conventional "Ford-Ferguson" tractor hitch to which the improvement of the invention is particularly applicable;

Figure 2 is a longitudinal cross-section of the rear portion of a tractor showing the tractor hitch and the hydraulic-lift mechanism therefor, with a rocker bracket illustrative of the invention operatively incorporated in the hitch mechanism;

Figure 4:
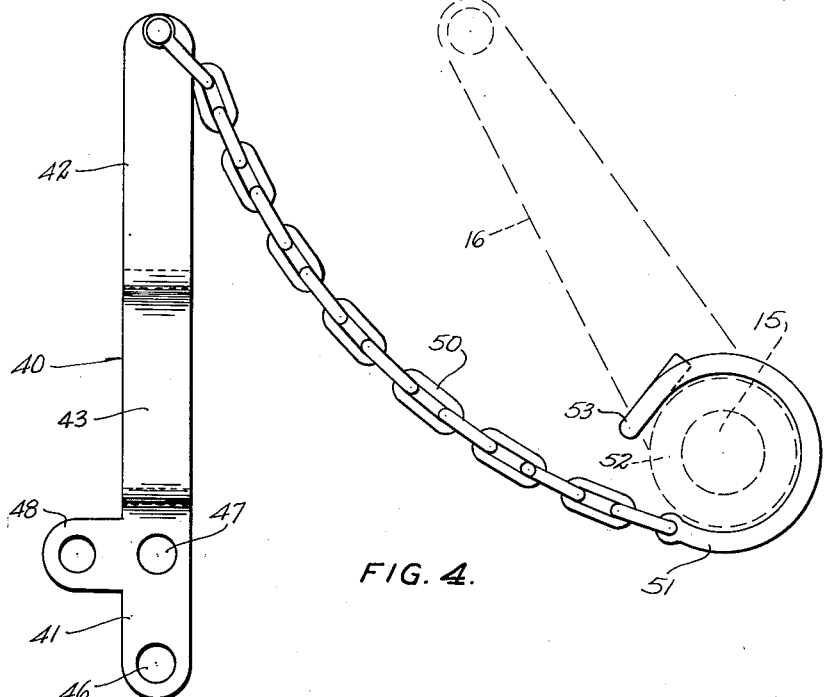
Figure 4 is a side elevation of the rocker bracket illustrated in Figure 3.

With continued reference to the drawings, Figure 1 illustrates, in diagrammatic form, a conventional tractor hitch of the "Ford-Ferguson" type with which the present invention is concerned, and Figure 2 illustrates the same tractor-hitch mechanism when modified in accordance with the present invention for manual control thereof.

In the "Ford-Ferguson" hitch the tractor tow is pulled by a tension link 10, the front end of which is pivotally connected to the rear portion of the tractor by a suitable bearing 11. In actual practice there are two such tension links disposed one at each end of the tractor differential housing 12 which links extend rearwardly of the tractor, substantially parallel to each other, and are pivotally connected at their rearward ends to the lower portion of the upright leg 13 of a rigid pulling bracket, generally indicated at 14, mounted on the upper part of an implement towed by the tractor.

A lift shaft 15 is rotatably mounted transversely of the tractor at a location somewhat above and ahead of the front connection 11 of the tension links and is provided with a pair of radially-extending arms 16, the outer ends of which are connected through lift struts 17 with respective tension links intermediate the length of such links. An arm 18 extends from the center portion of the shaft 15 into the differential housing of the tractor and receives at its lower end, one end of a piston rod 19, the opposite end of which is connected to a piston 20 reciprocal in a cylinder 21 fixed to the inside of the tractor differential housing. The piston 20 and cylinder 21 constitute a hydraulic ram which is operative through the arm 18 to rotate the lift shaft 15 in a direction to raise the outer ends of the lift arms 16 and the struts 17 to thereby lift the rear ends of the tension links 10 to raise the towing bracket 14 and thereby regulate the depth at which the tractor-towed implement operates.

Hydraulic fluid under pressure is provided by a hydraulic pump 22 which is connected to the cylinder 21 of the hydraulic ram through a suitable piston valve 23 which, in the conventional system shown in Figure 1, is automatically operated to maintain the tractor-towed, earth-tilling implement operating at a desired depth in the earth.

A two-part lever, generally indicated at 24, is slidably supported on a fixed portion of the tractor by suitable supporting rods 25 and is operatively connected at its lower end to the plunger or piston 26 of the valve 23. At its upper end lever 24 is provided with an abutment plate 27 which bears against a crank 28 which is rotatable by a manually-operated lever 29 to provide a movable fulcrum for the upper end of the valve-controlling lever. The manually-operated lever 29 may be secured in any desired position of adjustment by a suitable quadrant 30.

A master control spring 31 in the form of a coiled compression spring is mounted outside of the differential housing 12 and bears at its forward end against a fixed abutment 32. A control shaft 33 extends through the spring 31 and through the abutment 32 to the interior of the differential housing and is connected at its inner end to the valve-controlling lever 24 by a link rod 34. A spring abutment 35 is secured to the ends of rods 33 opposite the end of the rod passing through the fixed abutment 32 and this spring abutment 35 is provided with apertured lugs by means of which the abutment is pivotally connected to one point of a three-point rocker bracket 36. Another point of the rocker bracket 36 is pivotally connected to a fixed portion of the tractor such as the rearward end of the differential housing, as indicated at 37, and the third point is pivotally connected to the front end of a compression link 38, the rearward end of which is connected to the upper portion of the upright standard 13 of the towing bracket 14.

With the above-described arrangement, if the tractor-towed implement digs in too deeply the towing bracket 14 will be moved downwardly and tilted forwardly thereby forcing the compression link 38 forwardly to compress the control spring 31. Compression of the spring 31 moves the link rod 34 toward the cylinder 21 of the hydraulic ram thereby freeing the lever 24 for movement by the tension spring 39 in a direction to move the valve plunger 26 to connect the cylinder 21 with the outlet side of the hydraulic pump 22. The pump will then force hydraulic fluid pressure into the cylinder which fluid will act on the piston 20 to rotate the lift shaft 15 in a direction to raise the tension link 10 and thereby decrease the operating depth of the implement. If, on the other hand, the operation of the implement becomes too shallow, the compression link 38 will be moved rearwardly permitting the spring 31 to move the lever 24 in a direction to connect the hydraulic ram with the inlet side of the pump 22 through the valve 23 so that relief of fluid pressure in the hydraulic ram will permit the tension link 10 to drop, thereby engaging the implement more deeply in the earth. This depth control of a ground-tilling emplement by the tractor hitch is entirely automatic and the depth at which the mechanism automatically maintains the implement is regulated by moving the manually-operated lever 29 to shift the fulcrum of the upper end of lever 24. If the fulcrum is moved away from the valve 23 it will require a smaller movement of the compression link 38 to position the valve plunger for application of hydraulic fluid under pressure to the hydraulic ram, while if the fulcrum is moved toward the valve it will require a greater movement of the compression link to apply the hydraulic fluid under pressure to the hydraulic ram and the implement will consequently operate at a greater depth.

From the above description it is apparent that automatic control of the hydraulic lift mechanism of the tractor hitch is accomplished through the compression links 38. If these links be removed the spring 31 will remain in its fully-extended condition and the link rods 34 will provide a substantially fixed fulcrum for the intermediate portion of the lever 24. If now the manually-operated lever 29 is moved, the valve 23 will be positioned either to apply hydraulic fluid under pressure to the hydraulic ram, or drain fluid therefrom, but as there is no follow-up or compensating movement of the link rod 34, the fluid will be forced into or drained from the ram until the tension links 10 have been raised or lowered to their full range of movement.

The present invention contemplates the provision of suitable means operative to compress the control spring 31 upon lifting of the tension links 10 and thereby provide a follow-up for the movement of valve plunger 26 so that the valve plunger will be moved to a neutral position in which it shuts off the flow of fluid to and from the hydraulic ram when the tension links 10 have been brought to a position corresponding to the position of the manually-operated lever 29.

In order to accomplish this, a pair of arms are extended upwardly from the rocker bracket 36 and operatively connected at their upper ends to the lift shaft 15, or a rocker bracket having such arms thereon is substituted for the conventional rocker bracket shown in Figure 1.

Figure 3:
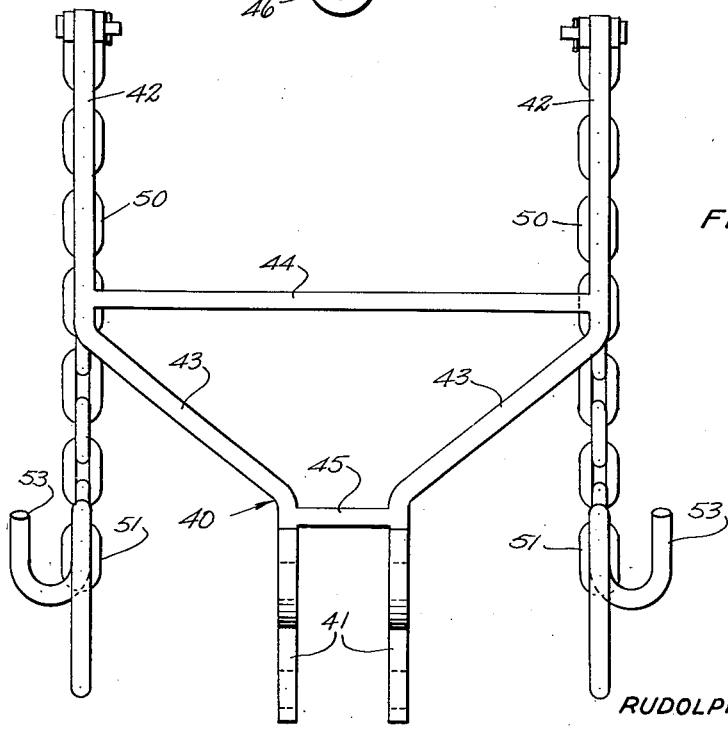
Figure 3 is a rear elevation of a rocker bracket illustrative of the invention.

In order to simplify the disclosure, the drawings show a substitute rocker bracket as generally indicated at 40 in Figure 2 and shown in detail in Figures 3 and 4.

As shown in Figures 3 and 4 the rocker bracket 40 comprises two side members or arms, the inner ends 41 of which are closely spaced and substantially parallel and the outer-end portions 42 of which are widely spaced and also substantially parallel, and the intermediate portions 43 of which respectively interconnect the inner and outer portions and are disposed at an obtuse angle to both the inner and outer portions of the corresponding side members or arms. A transverse member 44 connects the outer portions 42 of the side members adjacent their junction with the intermediate portions 43 and a transverse member 45 connects the inner-end portions 41 adjacent their junction with the intermediate portions 43 of the side members.

The inner-end portions 41 are provided with apertures 46 by means of which the bracket 40 is pivotally mounted on the fixed support 37 and are provided intermediate their length with apertures 47 by means of which the bracket is pivotally connected to the movable abutment 35 of the spring 31. Apertured lugs 48 are also provided by means of which the front end of the compression link 38 may be operatively connected to the bracket in case it is desired to return the hitch mechanism to automatic operation with the improved bracket operatively incorporated therein.

Flexible strands 50 are pivotally connected one to the outer end of each outer-end portion 42 of the bracket 40 and may conveniently be provided as link chains of comparatively light weight, although flexible cables, wires, or cords may be used provided they do not have sufficient stretch to render the operation of the mechanism inaccurate. Each strand 50 has secured to its end opposite the end attached to the rocker bracket 40 a hook 51 of partly-circular shape of a diameter to surround and closely fit the bosses 52 of the lift arms 16 and having re-curved end portions 53 which fit around the lift arms to rotate the hooks with the lift shaft when the lift shaft rotates in a direction to lower the tension link 10.

With the improved rocker bracket 40 operatively incorporated in the mechanism, as illustrated in Figure 2, if the manually-operated lever 29 be moved in a direction to shift the movable fulcrum 28 toward the valve 23 the valve plunger 26 will first be moved to connect the cylinder 21 with the intake of the pump 22 thereby permitting the lift shaft 15 to rotate in a direction to lower the rearward end of the tension link 10. As the lift shaft rotates it will tighten the strands 50 and pull the outer or upper ends of the rocker bracket 40 over in a direction to compress the spring 31 and move the link rod 30 toward the valve. This movement of the link rod 34 and the consequent movement of the valve operating link 24 will return the valve plunger 26 to its neutral position in which it cuts off the flow of fluid to and from the hydraulic mechanism. The tension links 10 will then be held at a lowered position corresponding to the position of adjustment to which the fulcrum 28 is brought by movement of the manually-operated lever 29. If, on the other hand, the lever 29 is operated to shift the fulcrum 28 in a direction away from the valve 23 the plunger 26 will be moved by spring 39 to a position in which it connects the outlet of pump 22 with the hydraulic ram, thereby forcing fluid under pressure into the ram to rotate the lift shaft 15 in a direction to raise the outer ends of the tension links 10. As the lift shaft rotates the strands 50 will be loosened permitting the spring 31 to expand and pull the links 24 against the force of spring 39 in a direction to return the valve plunger 26 to its neutral position so that the tension links will also be held in an elevated position corresponding to the position of adjustment to which the fulcrum 28 is brought by the manually-operated lever 29.

With the strands 50 operatively connected to the lift shaft 15 in the manner indicated, full manual control of the hydraulic lift mechanism of the hitch is obtained and the outer ends of the tension links 10 may be brought to any position desired by moving the manually-operated lever 29 to the corresponding position. Thus, the device may be used to raise and lower a bulldozer blade, a grading scoop or a snow plow or to lift the front end of a log or trailer and for various other purposes for which manual control of the lift mechanism is required.

If it is desired to return the lift mechanism to automatic operation, the strands 50 are disconnected from the rocker bracket 40 and the compression link 38 connected with the load whereupon the hydraulic lift mechanism will operate automatically in the manner described above in connection with Figure 1.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. The combination with a tractor hitch having tension links each pivotally connected at one end to said tractor for vertical swinging movement at their free ends, a lift shaft rotatably mounted on said tractor, lift arms extending radially from said lift shaft, tension struts respectively connecting the outer ends of said lift arms with said tension links, a hydraulic ram operatively connected with said lift shaft to raise said tension links when hydraulic fluid under pressure is applied to said ram, a fluid pump, a valve hydraulically interposed between said pump and said ram and operative to alternatively connect said ram with the inlet or outlet of said pump or block said ram against passage of fluid thereto or therefrom, a lever operatively connected at one end to said valve, a manually-movable fulcrum at the opposite end of said lever, a rod connected at one end to said lever and at the opposite end to a coiled compression spring to impart valve-controlling movement to said lever upon compression of said spring, and a three-point rocker bracket pivotally supported at one point on a fixed support and connected at another point to said compression spring, and a compression link pivotally connected to the third point of said bracket to provide automatic control of said valve; of means operative to provide manual control of said valve upon disconnection of said compression link from said bracket comprising an extension on the side of said rocker bracket opposite said one point thereof, a strand connected at one end to the outer end of said extension, and means extending the other end portion of said strand around said lift shaft and securing it to a lift arm whereby said control spring will be compressed upon rotation of said lift shaft by said ram thereby maintaining said valve-operating lever in operative engagement with said manually-movable fulcrum.

2. A rocker bracket for use in a hydraulically-operated tractor hitch comprising an apertured end portion pivotally supporting said bracket on a fixed support, an apertured intermediate portion operatively connected to a control spring, an extension on said apertured intermedial portion, a flexible lift shaft surrounding strand connected at one end to the outer end of said extension, a lift arm engaging hook on the opposite end of said strand for movement of said bracket upon rotational movement of said lift shaft.

3. A rocker bracket for use in a tractor hitch having a hydraulically operated lift mechanism comprising a pair of spaced apart arms having apertures at corresponding ends thereof for pivotally connecting said bracket at one end to a fixed portion of a tractor and apertures intermediate the length thereof for connecting said bracket to a hydraulic lift mechanism control, and flexible strands connected one to each arm at the other end of said bracket for connecting said bracket at its other end to lift mechanism lift arms.

4. A rocker bracket for use in a tractor hitch including an automatic implement lift mechanism to convert said lift mechanism from automatic to manual control comprising arms disposed in spaced apart relationship with the ends of the arms at one end of the bracket spaced apart a distance less than the distance between the ends of the arms at the other end of the bracket, said arms having mutually converging intermediate portions and each of said arms having substantially parallel end portions substantially parallel to the corresponding portions of the other arm, intermediate bracket members extending between and connected to said arms at the opposite ends of the mutually converging intermediate portions of said arms, said arms having mutually aligned apertures therein at said one end of the bracket and mutually aligned apertures between said one end of the bracket and the intermediate bracket member adjacent said one end of the bracket, and flexible members secured one to each of said arms at the other end of said bracket.

5. A rocker bracket for use in a tractor hitch including an automatic implement lift mechanism to convert said lift mechanism from automatic to manual control comprising arms disposed in spaced apart relationship with the ends of the arms at one end of the bracket spaced apart a distance less than the distance between the ends of the arms at the other end of the bracket, said arms having mutually converging intermediate portions and each of said arms having substantially parallel end portions substantially parallel to the corresponding portions of the other arm, intermediate bracket members extending between and connected to said arms at the opposite ends of the mutually converging intermediate portions of said arms, said arms having mutually aligned apertures therein at said one end of the bracket and mutually aligned apertures between said one end of the bracket and the intermediate bracket member adjacent said one end of the bracket, and flexible members secured one to each of said arms at the other end of said bracket, each of said flexible members being secured at one end to the corresponding arm, and hooks connected one to each flexible member at the ends of said flexible members remote from said arms.

6. In a tractor having a lift shaft carried by said tractor for rotation between limiting operative positions, hydraulic mechanism connected to said lift shaft for rotating the same, a valve controlling said hydraulic mechanism, valve operating means pivotally mounted on said tractor for connection to a tractor towed implement to provide automatic operation for said valve, and manually controlled means carried by said tractor and connected to said valve for providing manual adjustment of said valve under automatic control and manual operation of said valve for total movement of said lift shaft from one limiting position to the other, means for subjecting said lift shaft to control by said manually controlled means at all positions between said limiting positions comprising a bracket pivotally connected at one end to said tractor adjacent said valve operating means and pivotally connected intermediate its length to said valve operating means, and flexible means connecting the other end of said bracket to said lift shaft for movement of said valve operating means by said lift shaft to provide a follow up movement of said valve to movement of said manually controlled means.

7. In a tractor having a lift shaft carried by said tractor for rotation between limiting operative positions, hydraulic means connected to said lift shaft for rotating the same, a valve controlling said hydraulic mechanism, valve operating means pivotally mounted on said tractor for connection to a tractor towed implement to provide automatic operation for said valve, spring means biasing said valve operating means in one direction, and manually controlled means carried by said tractor and connected to said valve for providing manual adjustment of said valve under automatic control and manual operation of said valve for total movement of said lift shaft from one limiting position to the other, means for subjecting said lift shaft to control by said manual control means at all positions between said limiting positions comprising a bracket pivotally connected at one end to said tractor adjacent said valve operating means and pivotally connected intermediate its length to said valve operating means, and flexible means connecting the other end of said bracket to said lift shaft for movement of said valve operating means by said lift shaft against the force of said spring means to provide a follow up movement of said valve to movement of said manually controlled means.

RUDOLPH SCHUMAIER.

REFERENCES CITED

The following references are of record in the file of this patent:

UNITED STATES PATENTS

| Number | Name | Date |
| --- | --- | --- |
| 1,599,464 | Flynn | Sept. 14, 1926 |
| 1,842,790 | Lindgren et al. | Jan. 26, 1932 |
| 2,223,002 | Ferguson | Nov. 26, 1940 |
| 2,286,256 | Brown | June 16, 1942 |
| 2,294,188 | Kuntz | Aug. 25, 1942 |
| 2,392,903 | Currie | Jan. 15, 1946 |
| 2,398,365 | Ellis | Apr. 16, 1946 |
| 2,440,422 | Westmoreland | Apr. 27, 1948 |
| 2,460,847 | Schwarz | Feb. 8, 1949 |